United States Patent Office 3,352,828
Patented Nov. 14, 1967

3,352,828
POLYVINYL CARBAMATES CONTAINING $NF_2$ GROUPS AND PROCESSES FOR PRODUCING SAME
Anthony J. Passannante, Metuchen, N.J., assignor to Esso Research and Engineering Company, a corporation of Delaware
No Drawing. Filed Dec. 21, 1960, Ser. No. 77,463
8 Claims. (Cl. 260—77.5)

The present invention relates to a process for preparing polyvinyl carbamates containing $NF_2$ groups, such products being useful as rocket propellant binders having oxidizer properties. More specifically, it is concerned with the reaction of polyvinyl alcohol and the $N_2F_4$ adduct of vinyl isocyanate in a suitable diluent or solvent.

Rubbery materials and resins, among others, have been used as conventional binders in solid rocket propellants. However, there has been more interest in binders that additionally possess oxidizer properties which contribute to the specific impulse of the propellant since the binders generally make up a substantial proportion of the solid rocket propellant, e.g. 5-40 wt. percent. Recently is was found that desirable oxidizer binders are attained by reacting hydroxyl-containing polymers, such as polyvinyl alcohol, with isocyanates that contain one or more difluoramino groups, as disclosed in U.S. application Ser. No. 42,438, filed July 12, 1960, by Jack Rockett.

In accordance with the present invention, the method of reacting the hydroxyl-containing polymers with the isocyanate-$N_2F_4$ adducts is improved, particularly through the use of certain suitable diluents or solvents which make possible the reaction of more of the hydroxyl groups so that the final modified polymer products contain a high percentage of nitrogen and fluorine and a low percentage of unreacted OH groups.

The present invention provides a method of forming the modified polymers more efficiently by minimizing undesired side reactions. In a preferred embodiment it permits the polymer modification reaction to be carried out at ordinary room temperature with the formation of a novel modified polymer product in which substantially all the hydroxyl groups are reacted.

The major difficulty in getting the reaction of the poly alcohol polymer with the isocyanate-$N_2F_4$ adduct to proceed is the requirement that the poly alcohol must be solvated in order to afford contact between its hydroxyl groups and the isocyanate adduct which contains a highly reactive C—$NF_2$ group. This implies that to obtain high conversion of the hydroxyl groups, the poly alcohol must be dissolved or at least swelled by a solvent which does not adversely decompose the C—$NF_2$ groups.

It happens that pyridine, the solvent normally used in the preparation of polyvinyl carbamates and other basic solvents react vigorously with C—$NF_2$ groups and are therefore unsuitable. The reaction of the pyridine solvent with the $NF_2$-containing compound is quite extensive and results in the formation of intractable dark brown tars that are useless.

It has now been found that certain kinds of solvents, even such as not used ordinarily with poly alcohols or for reactions thereof, are particularly suitable to effect increased reaction between poly alcohols and the isocyanate-$N_2F_4$ adducts. It has been found that depending on the solvent used and appropriate conditions of reaction, various degrees of reaction between the poly alcohols and the isocyanates-$N_2F_4$ adducts may be attained. Among the most promising of these solvents are organic liquids which act like nitrobenzene in that they are characterized by containing an acid (negative) group and which are electron attracting and give the molecule a high dipole moment. These polar organic compounds may also be characterized as having a limited solubility in water in contrast to the usual polyvinyl alcohol solvents.

Polyvinyl carbamates made by reaction of polyvinyl alcohol with an isocyanate $N_2F_4$ adduct using a solvent acting like nitrobenzene are characterized by recurring carbamate groups of the following type:

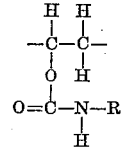

wherein R is a difluoramino-containing lower alkyl radical. The alkyl radical, which generally contains 2 to 6 carbon atoms, is preferably $\alpha,\beta$-di-(difluoramino)-ethyl. However, it can be any of the following radicals

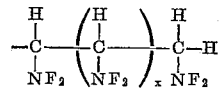

wherein $x$ is an integer of 0 to 4. The preferred embodiment, as mentioned above, is where $x$ is 0. Where $x$ is greater than 0, it is generally an even integer, i.e. 2 or 4. In polymers formed by reacting polyvinyl alcohol with isocyanate $N_2F_4$ adduct, the number of hydroxyl groups reacted in the polyvinyl alcohol depends on the severity of conditions and the kind of solvent or diluent used to dissolve, solvate or disperse the reactants. These solvents or diluents do not react with hydroxyl groups attached to a carbon chain nucleus of the polyvinyl alcohol, or similar polymer. By using the preferred solvents, at least 50% of the monomer units or hydroxyl groups in polyvinyl alcohol will contain the carbamate groups with fluoramino radicals. With a few hydroxyl groups unreacted, the polymer may be subsequently cured by mixing the polymer with a cross-linking agent such as a small amount of toluene diisocyanate.

The recurring groups of a desirable modified polymer product are the following:

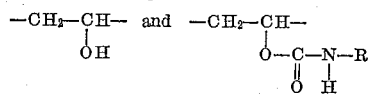

wherein R is a difluoramino-containing alkyl radical as defined above containing up to 6 carbon atoms. The number of monomer units in the polymer may vary from as low as 30 to 10,000 or more. The modified polymers are generally white to tan amorphous solids having densities in excess of 1 g./ml. They are relatively shock insensitive and insoluble in most of the common solvents.

The difluoramino isocyanate reactant is a lower molecular weight aliphatic compound containing at least one difluoramino group and a total of 3 to 7 carbon atoms. The preferred isocyanate reactants contain one $NF_2$ group per carbon atom in their alkyl radicals and can be prepared by simply adding tetrafluorohydrazine to the double bond(s) in an unsaturated isocyanate. For instance, tetrafluorohydrazine may be added to vinyl isocyanate by reacting stoichiometric amounts of the two substances at 100 to 150° C. for 1 to 24 hours. Excess $N_2F_4$, e.g. up to 10 moles/mole of isocyanate, may be used to improve the yield. Other isocyanate adducts that may be used are 1,2,3,4 - tetrakis - (difluoramino) - butyl-isocyanate and 1,2,3,4,5,6-hexakis-(difluoramino)hexyl-isocyanate.

The modified poly alcohol products are prepared by reacting the hydroxyl groups linked to the carbon chain with an isocyanate containing at least one difluoramino group. The temperature at which the reaction is carried out varies with the particular reactants and the particular solvents used. In general, the reaction temperatures that have been found suitable are in the range of 0° to 120° C. The pressure is usually atmospheric although superatmospheric or subatmospheric pressures can also be used. The reaction is generally complete about 1 to 10 hours after the reactants are brought to the proper temperature. Stirring or other agitation promotes the reaction and reduces the reaction time. The reaction can be effected in any suitable vessel, including a glass flask, provided it is properly protected against an explosion.

Although the difluoramino isocyanate reactant serves to some extent as a solvent for the reaction, it gives difficulties of maintaining intimate contact of the polymer with the isocyanate unless the reaction mixture is given a high degree of agitation and a large excess of the isocyanate is used, e.g. above 100% excess of isocyanate adduct. It is therefore advantageous to have the use of other solvents.

The hydroxyl-containing polymers that can be modified in accordance with the present invention have a carbon-carbon backbone and contain at least one functional hydroxyl group. They may be polyvinyl alcohol or partially hydrolzed polyvinyl esters, such as polyvinyl acetate or polyvinyl propionate. These polymers generally have a viscosity of about 2 to 70 cps. in a 4% water solution at 20° C. as determined by the Hoeppler falling ball method. The polyvinyl alcohol, which is the preferred polymer feed, is generally at least 85% hydrolyzed (i.e. hydrozlyed polyvinyl acetate) and has a pH of 6 to 8. The preferred polyvinyl alcohols are 97 to 100% hydrolyzed and have viscosities of 2 to 70 cps. in 4% water solutions at 20° C.

The following examples will provide a complete understanding of the method, products and the utility, as well as other advantages to be derived from the present invention.

*Example 1*

Using nitrobenzene as the solvent, reaction of a 10% excess over stoichiometric of vinyl isocyanate-$N_2F_4$ adduct with polyvinyl alcohol was carried out in this solvent at 100° C. to obtain a polyvinyl carbamate product containing 31.3% fluorine. This product showed the equivalent of 63% of the OH groups reacted. The yield, nitrogen (N) and fluorine (F) analyses are consistent with a polymer composed of the following two units:

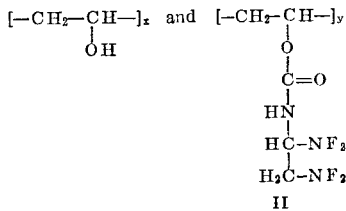

where $x=17$ and $y=63$ for each 100 units in the polymer. For such a polymer:

|  | Theory | Found |
| --- | --- | --- |
| Percent F | 31.3 | 31.3 |
| Percent N | 17.3 | 17.28 |
| Yield, g | 0.345 | 0.307 |

Similarly, modified polyvinyl alcohol products were attained which contained 43 wt. percent $NF_2$ groups corresponding to the reaction of 71.5% of the OH groups in the polyvinyl alcohol and this amounts to about 1 $NF_2/2.9$ carbon. This material is a white amorphous solid with a shock sensitivity of 24 kg. in. and a density of 1.4 g./ml. The following table summarizes typical results on the various degrees of reaction between the polyvinyl alcohol (PVA) and vinyl isocyanate-$N_2F_4$ adduct:

TABLE I.—EFFECTS OF SOLVENTS USED IN PVA/VINYL ISOCYANATE ADDUCT REACTION

| Solvents | Conditions, ° C./Hour | Product | |
| --- | --- | --- | --- |
|  |  | Percent Hydrolyzable F | Percent of OH Groups Reacted |
| Nitrobenzene | 100/2.5 | 31.3 | 63 |
| Acetonitrile | 82/3.5 | 30.5 | 58 |
| Tetrahydrofuran | 65/2.0 | 30.5 | 58 |
| Toluene | 110/4 | 29.1 | 50 |
| Benzotrifluoride | 102/3.5 | 20.9 | 23 |
| Diethyleneglycol Dimethylether | 100/18 | 5.33 | 3.5 |

It is shown by the data of Table I that the solvents which were found most suitable are the polar organic solvents containing an acid (negative) group such as nitrobenzene and acetonitrile.

*Example 2*

Using dimethylformamide (DMF) as the solvent at room temperature, e.g. 21° C., the vinyl isocyanate-$NF_2$ adduct was reacted therein with polyvinyl alcohol using a 3:1 ratio of the isocyanate to polyvinyl alcohol. The modified polymer product obtained contained 31.3% fluorine. Infrared (IR) examination of this product showed a strong absorption at 6.1$\mu$ (microns). This band is not present in the spectrum of methyl urethan of bis-difluoraminoethyl-isocyanate which should have a similar spectrum as the polyvinyl carbamate, but is present in $>C=NF$ compounds. These facts plus several others summarized below are consistent with a polymer having the following repeating unit:

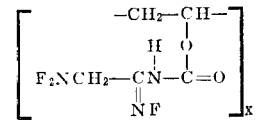

TABLE II.—DATA INDICATING THE STRUCTURE OF THE PRODUCT OBTAINED USING DMF AS SOLVENT

|  | Found | On Basis of 100% Conversion to Structure Shown | On Basis of 63% Conversion to Polyvinyl Carbamate Having 2 $NF_2$ Groups in each Carbamate Radical |
| --- | --- | --- | --- |
| Yield, g | 0.454 | 0.445 | 0.345 |
| Percent N | 21.6 | 21.3 | 17.5 |
| Percent F | 31.3 | 29.0 | 31.3 |
| IR, band $\mu$ | 6.1 | 6.1 | (1) |

[1] No band at this point.

Unlike the product obtained with the DMF solvent, the product obtained in using nitrobenzene as the solvent gave no infrared absorption at the 6.1 band. Thus it was found that the DMF solvent permitted the reaction to take place slowly at relatively low temperatures with a high conversion of the hydroxyl groups although with some elimination of HF. This product attained with the DMF solvent has the desired high content of fluorine which makes it an oxidizer of as high potency as the product obtained with nitrobenzene as the solvent.

The polymer products obtained in accordance with Example 1 and containing above 30% F are particularly useful as binders in solid rocket propellants, especially those containing boron as a fuel. Formulae for typical solid rocket propellants using these modified polymers as binders are as follows:

Components: Parts by wt.
   1,2,3,4-tetrakis-(difluoramino)-butane _____ 38.75
   Hexanitroethane _____ 30.18
   Boron _____ 1.07
   (—CH₂—CH—)ᵧ_____ 30.00

The foregoing propellant has a specific impulse of 282 sec.⁻¹. The polymer is also useful as a detonator or explosive.

The new NF₂-containing polyvinyl carbamate as prepared in Example 2 using the dimethyl formamide solvent is made with very nearly 100% conversion of the hydroxyl groups of the polyvinyl alcohol. This preparation has the advantage of being capable of using only slightly more than equivalent amounts of isocyanate-NF₂ adduct to effect complete reaction of the OH groups in the polyvinyl alcohol, thus reducing the risk of explosion.

The NF₂-containing polyvinyl carbamates made in accordance with Example 2, using the DMF solvent are shown to be particularly useful components of rocket propellant systems by their effectiveness for increasing the specific impulse, as in the following typical formulation:

Components: Parts by wt.
   1,2,3,4-tetrakis-(difluoramino)-butane _____ 35.95
   Hexanitroethane _____ 44.20
   Oxidizer-Binder:

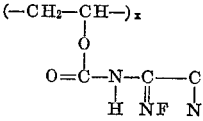

_____ 19.85

The foregoing propellant has a specific impulse of approximately 280 sec.⁻¹. This new polymer is also useful as a detonator or explosive.

Another isocyanate-N₂F₄ adduct suitable for reaction with OH groups attached to a carbon chain polymer, such as polyvinyl alcohol, [—CH₂—CH(OH)—]ₙ, is the furyl isocyanate-N₂F₄ adduct, particularly tetrakis (NF₂) furyl isocyanate, C₄H₃O(NF₂)₄NCO, and its higher NF₂-content substitution derivatives.

The furyl isocyanate-N₂F₄ reaction products are made by a mixture of furyl isocyanate with 2 to 10 moles or more of N₂F₄ per mole of furyl isocyanate,

C₄H₃O(—N=C=O)

to a reaction temperature in the range of about 100° C. to 250° C. or higher. At 100° C., and at superatmospheric pressure, e.g., 200 p.s.i., using 5 moles N₂F₄/mole of furyl isocyanate, in 18 hours the tetrakis (NF₂) adduct has been obtained as principal product. At high temperatures, e.g., 250° C., and with higher excess N₂F₄, the reaction of the furyl isocyanate in a short period of 20 minutes to an hour formed products having higher NF₂ content than the tetrakis (NF₂) adduct and which have been identified as pentakis and hexakis (NF₂) furyl isocyanates.

The preparation of the multi (NF₂) furyl isocyanate products is described and claimed in U.S. application Ser. No. 77,462, filed Dec. 21, 1960, by A. J. Passannante et al.

By employing effective diluents or solvents as set forth in Examples 1 and 2, the multi (NF₂) furyl isocyanate derivatives are reacted with polyvinyl alcohol in the same manner to obtain analogous polyvinyl carbamates having many as 4 to 6 NF₂ groups attached to the carbon atoms of the furan rings linked by carbamate radicals.

The polyvinyl carbamates formed with the multi (NF₂) furyl isocyanates are synthesized to contain the recurring unit:

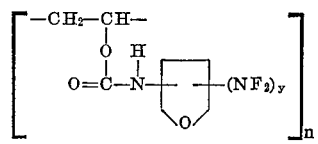

wherein $n$ is the number of such units in a chain having the carbamate radical linkage to a furan ring to which $y$ (NF₂) groups are attached, $y$ being 4 to 6 in number. The number of units may vary as indicated and be in the range of 30 to more than 10,000.

The polyvinyl carbamates formed with multi (NF₂) furyl isocyanate are useful as binders in propellant compositions. In a composite containing tetrakis (NF₂) butane as fluorine oxidizer of 1NF₂/C, hexanitroethane as oxygen oxidizer, and powdered boron, such a binder raises the specific impulse to above 282 seconds, depending on the ratio of NF₂ groups to C in the furan nucleus.

It is not intended to restrict the present invention to the foregoing examples which are merely given to demonstrate embodiments of the invention. It should only be limited to the appended claims in which it is intended to claim all the novelty inherent in the invention as well as the modifications and equivalents coming within the scope and spirit of the invention.

What is claimed is:

1. A polyvinyl carbamate containing NF₂ groups characterized by the recurring unit:

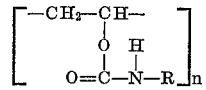

wherein $n$ is about 30 to 10,000 and R is a difluoramino substituted radical selected from the group consisting of alkyl radicals having 2 to 6 carbon atoms with NF₂ substituent groups and of a multi NF₂-furyl adduct having 4 to 6 NF₂ groups attached to the carbon atoms in the furan ring.

2. A modified polyvinyl alcohol characterized by the recurring unit:

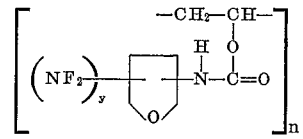

in which $n$ is about 30 to 10,000 and $y$ is a number of 4 to 6.

3. Modified polyvinyl alcohol characterized by the recurring unit:

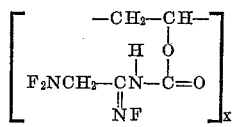

wherein $x$ is a number of about 30 to 10,000.

4. A process for modifying polyvinyl alcohol to form as a product a polyvinyl carbamate having NF₂ constituents which comprises (I) reacting in the presence of a liquid organic solvent selected from the group consisting of nitrobenzene, acetonitrile, tetrahydrofuran, dimethyl formamide, and mixtures thereof (i) a polyvinyl alcohol with (ii) sufficient isocyanate-N₂F₄ adduct to react more than 50% of the hydroxyl groups in said polyvinyl alcohol, said isocyanate-N₂F₄ adduct being selected from the group consisting of (A) alkyl isocyanates having 2 to 6 carbon atoms with 1 NF₂ group per carbon atom and (B) furyl isocyanate having an NF₂ group linked to each carbon atom and (II) recovering as a resulting product a polyvinyl carbamate containing NF₂ groups.

5. A process for modifying polyvinyl alcohol to form as a product a polyvinyl carbamate having NF₂ constituents which comprises reacting polyvinyl alcohol with sufficient vinyl isocyanate-N₂F₄ adduct in nitrobenzene as liquid solvent until more than 50% of the hydroxyl groups in the polyvinyl alcohol are reacted.

6. A process for modifying polyvinyl alcohol to form as a product a polyvinyl carbamate having NF₂ constituents which comprises reacting polyvinyl alcohol with sufficient vinyl isocyanate-N₂F₄ adduct in acetonitrile as liquid solvent until more than 50% of the hydroxyl groups in the polyvinyl alcohol are reacted.

7. A process for modifying polyvinyl alcohol to form as a product a polyvinyl carbamate having $NF_2$ constituents which comprises reacting polyvinyl alcohol with sufficient vinyl isocyanate-$N_2F_4$ adduct in tetrahydrofuran as liquid solvent until more than 50% of the hydroxyl groups in the polyvinyl alcohol are reacted.

8. A process for modifying polyvinyl alcohol to form as a product a polyvinyl carbamate having $NF_2$ constituents which comprises reacting polyvinyl alcohol with sufficient vinyl isocyanate-$N_2F_4$ adduct in dimethyl formamide as liquid solvent until more than 50% of the hydroxyl groups in the polyvinyl alcohol are reacted.

No references cited.

DONALD E. CZAJA, *Primary Examiner.*

LEON J. BERCOVITZ, L. D. ROSDOL, *Examiners.*

F. McKLEVEY, J. W. WHISLER, *Assistant Examiners.*